Patented June 15, 1943

2,322,197

UNITED STATES PATENT OFFICE 2,322,197

ROSIN BASE RESIN

Frank G. Oswald, Newark, Del., assignor to Hercules Powder Company, Wilmington, Del., a corporation of Delaware No Drawing. Application April 22, 1941,
Serial No. 389,742

17 Claims. (Cl. 260—26)

This invention relates to resins comprising rosin as the basic ingredient. More particularly it relates to resinous materials comprising an esterification product of a pentaerythritol with a rosin acid or modified rosin acid and an alpha-beta unsaturated polybasic acid, and a method for preparing the same.

It has heretofore been known to produce resins of desirable properties such as the glycerol ester of rosin-maleic anhydride, rosin esters of pentaerythritol, etc., using rosin as the basic ingredient. However, for certain purposes, such resins have not been entirely satisfactory.

It is an object of this invention to provide new resins having rosin as a basis which are of improved characteristics.

A further object of this invention is to provide oil soluble resins improved in certain characteristics such as heat stability and hardness, making them eminently suitable for certain specific uses.

Other objects of this invention will appear hereinafter.

The objects of this invention are broadly accomplished by contacting a rosin acid or modified rosin acid with a limited amount of an alpha-beta unsaturated polybasic acid and with pentaerythritol at suitable temperatures to cause the formation of a resin comprising a soluble-fusible type esterification product of the pentaerythritol with the rosin acid or modified rosin acid and the limited amount of the alpha-beta unsaturated polybasic acid.

The resinous materials of this invention may be produced with rosin acids comprising any of the rosins or modified rosins or their mixtures. Thus abietic acid or isomeric rosin acids or their mixtures comprising unmodified rosins such as gum rosin and wood rosin, or modified rosin acids such as those comprising heat treated rosin, "Hyex" (disproportionated) rosin, hydrogenated rosin or polymerized rosin may be employed according to this invention. The term "rosin acid" as used herein refers to any such rosin acid or modified rosin acid or mixture thereof.

The properties of the resin produced according to this invention will depend on the exact chemical nature of the rosin acid or rosin acid mixture employed. Thus, in the above series of rosin acids, polymerized rosin may yield a resin of highest melting point, gum rosin yielding a resin which may not be as high melting as yielded by some polymerized rosins, and wood rosin, heat treated rosin, disproportionated and hydrogenated rosins generally yielding resins slightly lower in melting point than gum rosin. Where polymerized rosin is employed, the degree of polymerization, or differently stated, the average molecular weight of the polymerized rosin will affect the melting point of the resin produced, the polymerized rosins of higher average molecular weight forming the higher melting resins.

Any alpha-beta unsaturated polybasic acids including their anhydrides, such as maleic acid or anhydride, fumaric acid, itaconic acid, etc., may be employed according to this invention, and the term "alpha-beta unsaturated polybasic acid" as used herein and in the appended claims is meant to denote any of these acids including their anhydrides or mixtures thereof. However, the amount of the acid employed has an important effect on the properties of the resin produced. Thus when maleic anhydride is employed in producing the new resins of this invention, the amount of maleic anhydride employed in the resin must be maintained below the rather critical limit of about 9% based on the weight of rosin acids employed in the resin. The resins of this invention containing an amount of maleic anhydride less than about 9% by weight based on the rosin acids employed in the resins, are high melting, hard, stable at high temperatures and may be quite soluble in many solvents including oils such as linseed oil. Such resins may be cooked with the "soft oils" such as linseed oil, perilla oil, etc. at extremely high cooking temperatures without discoloration, the cooking mixture bodying very rapidly to form varnishes which yield films having good color, very high hardness, durability, and alkali resistance. Varnishes thus formed may compare quite favorably with the expensive tung oil varnishes.

In general, when amounts of maleic anhydride below this limit of less than about 9% are employed in the resin, the properties of hardness, elevation of melting point and high heat stability of the resin, and the properties of hardness, alkali resistance, etc., of the soft oil varnishes which may be produced therefrom are proportional to the amount of the maleic anhydride employed. However, in order to produce the resins markedly improved in those properties over corresponding pentaerythritol rosin esters not containing any maleic anhydride, it is generally desirable to maintain the amount of maleic anhydride above at least about 1% based on the weight of rosin acid employed in forming the resin. On the other hand, as the amount of maleic anhydride is increased, the solubility and compatibility of the resin produced decreases until complete insolubility in oils and gelling of the resin is obtained above about 9% by weight of maleic anhydride. In order to produce resins having wide compatibility and good solubility in oils and particularly in the bodied oils, it will be desirable to maintain the amount of maleic anhydride employed below about 5% based on the weight of rosin acids employed. The resins produced by employing an amount of maleic anhydride within the preferred range of from about 1% to about 5% combine the advantages of high melting point, etc., with the advantages of good oil solubility and wide compatibility. In general, the effect of an amount of any of the alpha-beta unsaturated polybasic acid will be very nearly equal to the effect of a molecularly equivalent amount of maleic anhydride. Therefore, in the resins according to this invention, the amount of alpha-beta unsaturated polybasic acid employed in the resin will be molecularly equivalent to the amount of maleic anhydride which may be used. That is, the alpha-beta unsaturated polybasic acids will be employed in an amount molecularly equivalent to an amount of maleic anhydride of less than about 9%, and preferably from about 1% to about 5% by weight based on the weight of rosin acids employed in the resin.

In carrying out the esterification, the proportions of the reactants are not particularly critical. However, in order to produce resins of low acid number, it is generally desirable to have present in the reaction mixture at least the theoretical amount of alcohol present to react with the acid radicals presented. In general, a slight theoretical excess of the pentaerythritol is preferably employed as is illustrated in the examples following herein.

The resinous composition of this invention may be produced by contacting rosin, the alpha-beta unsaturated polybasic acid and the pentaerythritol at elevated temperatures and for periods of time such that the esterification reactions may be substantially completed.

If desired, the reactions may be carried out in a stepwise manner, for example, by contacting the rosin acid and pentaerythritol separately, partially esterifying the pentaerythritol, and then adding the alpha-beta unsaturated polybasic acid and completing the esterification, or the reactions may be carried out in one operation by contacting all ingredients together at the elevated temperature.

The esterification reaction may be carried out at suitable elevated temperatures. The reaction takes place above about 250° C., and much more favorably above 285° C. While the rosin, the alpha-beta unsaturated polybasic acid and the pentaerythritol are alone not particularly heat stable, the esters formed from them are extremely heat stable. Hence, in order to form the light colored resins, it is desirable initially to contact the rosin, alpha-beta unsaturated polybasic acid and pentaerythritol at temperatures as far below the final reaction temperature as possible, preferably below about 230° C. The temperature may then be gradually raised and the reaction completed at a temperature above about 250° C. and preferably above about 285° C., but preferably below about 315° C. to avoid darkening. If desired, the esterification may be carried out in the presence of suitable esterification catalysts such as boric acid or zinc powder. In such case, lower esterification temperatures are possible, and temperatures as low as 240° C. or lower may be feasible.

No fixed time necessary for the reactions may be given since they may vary with the temperatures employed, the exact chemical nature of the particular reactants employed, the acid number of the final composition desired, etc. However, the examples below will serve generally to indicate the time which may be necessary in a given case.

During the reaction, and wherever the composition or its component materials may be exposed to high temperature, it is very desirable to use an inert atmosphere such as $N_2$ or $CO_2$, thus preventing darkening due to atmospheric oxidation.

After the reaction period in order to produce compositions of highest possible melting point and degree of purity, it is desirable to sparge the composition. In the sparging operation any inert gas such as steam, $N_2$ or $CO_2$ is swept through the composition at an elevated temperature removing the slightly volatile impurities such as pentaerythritol, rosin oils, etc., which may be present in the composition. Vacuum distillation or vacuum distillation in combination with sparging may likewise be used to remove such volatile impurities.

The following examples are illustrative of the new resins of this invention and of the process for preparing the same.

*Example 1*

One hundred parts by weight of wood rosin were heated to a temperature just above its melting point, and to this was added 3.5 parts by weight of maleic anhydride. The mixture was gradually heated over a one-hour period to 225° C., and maintained at this temperature for an additional hour. Thirteen parts by weight of pentaerythritol was then added, and the mixture was then heated gradually over a one-hour period to 290° C., and maintained at this temperature for an additional 12 hours. The reactions were carried out in a vessel fitted with a steam condenser arranged to permit the escape of water formed in the esterification and to prevent the escape of the pentaerythritol. During the operations at high temperatures, the reaction mixtures were blanketed with $CO_2$ by passing a slow stream of $CO_2$ into the reaction mixture. After the reactions were substantially completed, the resinous composition was sparged for one hour with $CO_2$ at 290° C. The resin formed had an acid number of 15, a drop melting point of 130° C., and a color of 38 Amber Lovibond scale or N Standard U. S. Rosin type. This resin had good solubility in bodied linseed oil.

*Example 2*

A polymerized rosin was prepared as follows: A benzene solution containing about 35% by weight of wood rosin color grade I Standard U. S. Rosin type was treated with 25% of its weight of 95% sulfuric acid and kept at a temperature of 13–18° C. with stirring for one hour. The reaction mixture was then allowed to stand for 15 minutes, and the benzene solution was decanted from the sludge. The benzene solution was then water-washed to remove the acid, and the polymerized rosin recovered from the washed benzene solution by evaporating the solvent. The polymerized rosin prepared had a drop melting point of 100° C., an acid number of 155 and a color grade M Standard U. S. Rosin type.

One hundred parts by weight of the above-prepared polymerized rosin, and 4.5 parts by weight of maleic anhydride were esterified with 15 parts by weight of pentaerythritol, the temperature of the esterification being gradually raised to 290° C., and maintained at this temperature for 12 hours. The reactions were carried out in equipment described in Example 1, and likewise under a blanket of $CO_2$. The resin obtained after the reaction period was sparged with $CO_2$ for one hour at 290° C. The final resin obtained had a drop melting point of 152° C., an acid number of 15 and a color grade M Standard U. S. Rosin type. The resin had good solubility in bodied linseed oil.

It will be understood that the details and examples hereinbefore set forth are illustrative only and that the invention as broadly described and claimed is in no way limited thereby.

What I claim and desire to protect by Letters Patent is:

1. A resin comprising a hard, stable, oil-soluble ester of penetaerythritol, a rosin acid and an alpha-beta unsaturated polybasic acid, the amount of said unsaturated polybasic acid employed in the resin being equivalent to an amount of maleic anhydride of above about 1% and less than about 9% by weight based on the weight of said rosin acid, and the rosin and polybasic acid groups being substantially completely esterified.

2. A resin comprising a hard, stable, oil-soluble ester of pentaerythritol, a rosin acid and an alpha-beta unsaturated polybasic acid, the amount of said alpha-beta unsaturated polybasic acid employed in the resin being equivalent to an amount of maleic anhydride falling within the range of about 1% to about 5% by weight based on the weight of said rosin acid, the rosin and polybasic acid groups being substantially completely esterified.

3. A process for producing a hard, stable, oil-soluble resin which comprises contacting a rosin acid with pentaerythritol and an alpha-beta unsaturated polybasic acid, the amount of said alpha-beta unsaturated polybasic acid being equivalent to an amount of maleic anhydride of above about 1% and less than about 9% by weight, based on the weight of said rosin acid, at suitable temperatures and for a period of time to cause substantially complete esterification of the acids with said pentaerythritol.

4. A process for producing a hard, stable, oil-soluble resin which comprises contacting a rosin acid with pentaerythritol and an alpha-beta unsaturated polybasic acid, the amount of said alpha-beta unsaturated polybasic acid being equivalent to an amount of maleic anhydride falling within the range of about 1% to about 5% by weight, based on the weight of said rosin acid, at suitable temperatures and for a period of time to cause substantially complete esterification of the acids with said pentaerythritol.

5. A process for producing a hard, stable, oil-soluble resin which comprises contacting a rosin acid with pentaerythritol and an alpha-beta unsaturated polybasic acid, the amount of said alpha-beta unsaturated polybasic acid being equivalent to an amount of maleic anhydride falling within the range of from about 1% to about 9% by weight, based on the weight of said rosin acid, at a temperature within the range of about 250° C. to about 315° C. for a period of time sufficient to substantially completely esterify the acids to form the said resin.

6. A process for producing a hard, stable, oil-soluble resin which comprises contacting a rosin acid with pentaerythritol and an alpha-beta unsaturated polybasic acid, the amount of said alpha-beta unsaturated polybasic acid being equivalent to an amount of maleic anhydride falling within the range of from about 1% to about 5% by weight, based on the weight of said rosin acid, at temperatures below about 230° C., slowly increasing the temperature to a temperature within the range of about 285° to about 315° C. and maintaining the temperature within this range for a period of time sufficient to substantially completely esterify the acids to form the said resin.

7. A hard, stable, oil-soluble rosin product consisting essentially of an ester of rosin acids, maleic acid, and pentaerythritol in which the amount of maleic acid is equivalent to an amount of maleic anhydride between about 1% and about 5% by weight of the rosin acids, and the rosin and maleic acid groups are substantially completely esterified.

8. A hard, stable, oil-soluble rosin product consisting essentially of an ester of an unmodified rosin, maleic acid, and pentaerythritol in which the amount of maleic acid is equivalent to an amount of maleic anhydride between about 1% and about 5% by weight of the acids in the rosin, and the rosin and maleic acid groups are substantially completely esterified.

9. A hard, stable, oil-soluble rosin product consisting essentially of an ester of polymerized rosin, maleic acid, and pentaerythritol in which the amount of maleic acid is equivalent to an amount of maleic anhydride between about 1% and about 5% by weight of the acids in the polymerized rosin, and the rosin and maleic acid groups are substantially completely esterified.

10. A hard, stable, oil-soluble rosin product consisting essentially of an ester of hydrogenated rosin, maleic acid, and pentaerythritol in which the amount of maleic acid is equivalent to an amount of maleic anhydride between about 1% and about 5% by weight of the hydrogenated rosin, and the rosin and maleic acid groups are substantially completely esterified.

11. A hard, stable, oil-soluble, resinous ester of pentaerythritol with a rosin acid and maleic acid, the reacted maleic acid content being equivalent to an amount of maleic anhydride above about 1% and less than about 9% by weight based on the weight of the rosin acid, and the rosin and maleic acid groups being substantially completely esterified.

12. A hard, stable, oil-soluble rosin product consisting essentially of an ester of rosin, an alpha-beta unsaturated polybasic acid, and pentaerythritol in which the alpha-beta unsaturated acid is in an amount equivalent to a quantity of maleic anhydride from about 1% to less than about 9% by weight of the rosin acid in the ester, and the rosin and polybasic acid groups are substantially completely esterified.

13. A hard, stable, oil-soluble rosin product consisting essentially of an ester of a rosin, pentaerythritol, and maleic acid in which the amount of maleic acid is equivalent to maleic anhydride about 3½% by weight of the rosin acid, and the rosin and maleic acid groups are substantially completely esterified.

14. A process for producing a hard, stable, oil-soluble resin which comprises heating together a rosin and an alpha-beta unsaturated polybasic acid in an amount equivalent to an amount of maleic anhydride within the range of from about 1% to less than about 9% by weight, based on the weight of the rosin, to at least about 225° C., permitting reaction between the rosin and the alpha-beta unsaturated acid to take place during the heating and at the said temperature, adding pentaerythritol to the mixture, heating further to a temperature of at least 240° C., and sufficient to cause esterification of the rosin-unsaturated polybasic acid product by the pentaerythritol, and continuing heating the mixture until the pentaerythritol substantially completely esterifies the acid components to form the stable, oil-soluble resin.

15. A process for producing a hard, stable, oil-soluble resin which comprises heating a rosin acid with maleic anhydride in an amount from about 1% to less than about 9% by weight of the rosin acid and with pentaerythritol at a temperature between about 250° C. and about 315° C. until the acids are substantially completely esterified to produce the said resin.

16. A process for producing a hard, stable, oil-soluble resin which comprises heating a rosin acid with maleic anhydride in an amount from about 1% to about 5% by weight of the rosin acid and with pentaerythritol at a temperature between about 250° C. and about 315° C. until the acids are substantially completely esterified to produce the said resin.

17. A process for producing a hard, stable, oil-soluble resin which comprises heating rosin with maleic anhydride in an amount from about 1% to less than about 9% by weight of the rosin and with pentaerythritol to and at temperatures in the range between about 285° C. and about 315° C. and maintaining the mixture in the said temperature range until the acids are substantially completely esterified to form the said resin.

FRANK G. OSWALD.